US010407592B2

(12) United States Patent
Amajjahe et al.

(10) Patent No.: US 10,407,592 B2
(45) Date of Patent: Sep. 10, 2019

(54) CURABLE POLYMERS

(71) Applicant: Evonik Degussa GmbH, Essen (DE)

(72) Inventors: Sadik Amajjahe, Düsseldorf (DE); Frauke Henning, Essen (DE); Wilfried Knott, Essen (DE); Horst Dudzik, Essen (DE); Gabriele Platte, Castrop-Rauxel (DE); Florian Gaber, Mülheim an der Ruhr (DE); Hardi Döhler, Essen (DE)

(73) Assignee: Evonik Degussa GmbH, Essen (DE)

( * ) Notice: Subject to any disclaimer, the term of this patent is extended or adjusted under 35 U.S.C. 154(b) by 29 days.

(21) Appl. No.: 15/760,320

(22) PCT Filed: Oct. 13, 2016

(86) PCT No.: PCT/EP2016/074554
§ 371 (c)(1),
(2) Date: Mar. 15, 2018

(87) PCT Pub. No.: WO2017/080747
PCT Pub. Date: May 18, 2017

(65) Prior Publication Data
US 2019/0048228 A1     Feb. 14, 2019

(30) Foreign Application Priority Data

Nov. 11, 2015   (EP) .................................. 15194027

(51) Int. Cl.
| | | |
|---|---|---|
| C08G 77/08 | (2006.01) | |
| C08G 77/14 | (2006.01) | |
| C08G 77/38 | (2006.01) | |
| C09D 183/06 | (2006.01) | |
| C08G 77/16 | (2006.01) | |
| C08G 77/20 | (2006.01) | |

(52) U.S. Cl.
CPC ........... C09D 183/06 (2013.01); C08G 77/08 (2013.01); C08G 77/14 (2013.01); C08G 77/38 (2013.01); C08G 77/16 (2013.01); C08G 77/20 (2013.01)

(58) Field of Classification Search
CPC ........ C08G 77/04; C08G 77/08; C08G 77/14; C08G 77/38
See application file for complete search history.

(56) References Cited

U.S. PATENT DOCUMENTS

| | | | |
|---|---|---|---|
| 4,069,242 A * | 1/1978 | Gurgiolo | ................. C07C 67/26 502/159 |
| 4,978,726 A | 12/1990 | Doehler et al. | |
| 5,093,101 A | 3/1992 | Koerner et al. | |
| 5,145,915 A | 9/1992 | Dohler et al. | |
| 5,146,005 A | 9/1992 | Dohler et al. | |
| 5,198,207 A | 3/1993 | Koerner et al. | |
| 5,221,499 A | 6/1993 | Koerner et al. | |
| 5,260,402 A | 11/1993 | Dohler et al. | |
| 5,371,161 A | 12/1994 | Knott | |
| 5,430,166 A | 7/1995 | Koemer et al. | |
| 5,430,167 A | 7/1995 | Koemer et al. | |
| 5,455,367 A | 10/1995 | Koemer et al. | |
| 5,475,127 A | 12/1995 | Klein et al. | |
| 5,565,183 A | 10/1996 | Knott | |
| 5,670,129 A | 9/1997 | Klapdor et al. | |
| 5,831,103 A | 11/1998 | Knott | |
| 5,856,548 A | 1/1999 | Drose et al. | |
| 5,934,579 A | 8/1999 | Hiersche et al. | |
| 5,951,739 A | 9/1999 | Klapdor et al. | |
| 5,981,812 A | 9/1999 | Eufinger et al. | |
| 5,972,285 A | 10/1999 | Knott | |
| 6,197,089 B1 | 3/2001 | Frommeyer et al. | |
| 6,211,322 B1 | 4/2001 | Dohler et al. | |
| 6,255,511 B1 | 7/2001 | Klein et al. | |
| 6,268,404 B1 | 7/2001 | Dohler et al. | |
| 6,291,622 B1 | 9/2001 | Drose et al. | |
| 6,307,082 B1 | 10/2001 | Klein et al. | |
| 6,387,154 B1 | 5/2002 | Frommeyer et al. | |
| 6,444,007 B1 | 9/2002 | Knott et al. | |
| 6,489,498 B2 | 12/2002 | Klein et al. | |
| 6,521,771 B2 | 2/2003 | Frommeyer et al. | |
| 6,548,568 B1 * | 4/2003 | Pinto | .................... C08F 283/12 522/99 |
| 6,659,162 B2 | 12/2003 | Frommeyer et al. | |
| 6,854,506 B2 | 2/2005 | Knott et al. | |
| 6,858,663 B2 | 2/2005 | Knott et al. | |

(Continued)

FOREIGN PATENT DOCUMENTS

| | | |
|---|---|---|
| DE | 3820294 C1 | 10/1989 |
| EP | 0514737 A1 | 2/1996 |

(Continued)

OTHER PUBLICATIONS

Amajjahe et al., U.S. Appl. No. 15/760,855, filed Mar. 16, 2018.
German language Written Opinion dated Nov. 8, 2016, in PCT/EP2016/074565 (6 pages).
German language International Search Report dated Nov. 8, 2016, in PCT/EP2016/074565 (3 pages).
International Search Report dated Nov. 8, 2016, in PCT/EP2016/074565 (2 pages).
Knott et al., U.S. Appl. No. 15/719,775, filed Sep. 29, 2017.
Knott et al., U.S. Appl. No. 15/923,552, filed Mar. 16, 2018.
German language International Search Report dated Nov. 11, 2016 in PCT/EP20161074554 (3 pages).

(Continued)

*Primary Examiner* — Caixia Lu
(74) *Attorney, Agent, or Firm* — Philip P. McCann; Nexsen Pruet PLLC

(57) ABSTRACT

Described is a method for synthesizing polymer compounds (P), preferably polysiloxanes, comprising at least one carboxylic ester group, in particular (meth)acrylate-containing polysiloxanes, said method being carried out in the presence of conversion products (U) of metal salts, in particular chromium(III) salts, and conversion products of aldehydes and primary amines.

15 Claims, No Drawings

(56) References Cited

U.S. PATENT DOCUMENTS

| | | |
|---|---|---|
| 6,874,562 B2 | 4/2005 | Knott et al. |
| 6,915,834 B2 | 7/2005 | Knott et al. |
| 6,942,716 B2 | 9/2005 | Knott et al. |
| 7,018,458 B2 | 3/2006 | Knott et al. |
| 7,125,585 B2 | 10/2006 | Dudzik et al. |
| 7,157,541 B2 | 1/2007 | Knott et al. |
| 7,196,153 B2 | 3/2007 | Burkhart et al. |
| 7,250,204 B2 | 7/2007 | Brand et al. |
| 7,276,541 B2 | 10/2007 | Dohler et al. |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,659,425 B2 | 2/2010 | Weikard et al. |
| 7,727,599 B2 | 6/2010 | Doehler et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 7,893,128 B2 | 2/2011 | Busch et al. |
| 8,030,366 B2 | 10/2011 | Ferenz et al. |
| 8,138,294 B2 | 3/2012 | Henning et al. |
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,349,907 B2 | 1/2013 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,609,798 B2 | 12/2013 | Knott et al. |
| 8,722,834 B2 | 5/2014 | Knott et al. |
| 8,722,836 B2 | 5/2014 | Knott et al. |
| 8,729,207 B2 | 5/2014 | Hartung et al. |
| 8,796,198 B2 | 5/2014 | Henning et al. |
| 8,623,984 B2 | 7/2014 | Henning et al. |
| 8,772,423 B2 | 7/2014 | De Gans et al. |
| 8,778,319 B2 | 7/2014 | Herrwerth et al. |
| 8,779,079 B2 | 7/2014 | Henning et al. |
| 8,802,744 B2 | 8/2014 | Knott et al. |
| 8,841,400 B2 | 9/2014 | Henning et al. |
| 8,921,437 B2 | 12/2014 | Knott et al. |
| 8,957,009 B2 | 2/2015 | Schubert et al. |
| 8,946,369 B2 | 3/2015 | Henning et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,005,361 B2 | 4/2015 | Henning |
| 9,035,011 B2 | 5/2015 | Ferenz et al. |
| 9,068,044 B2 | 6/2015 | Schubert et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 9,441,145 B2 | 9/2016 | Schubert et al. |
| 9,481,695 B2 | 11/2016 | Knott et al. |
| 9,695,202 B2 | 7/2017 | Henning et al. |
| 9,539,549 B2 | 10/2017 | Haensel et al. |
| 9,783,635 B2 | 10/2017 | Schubert et al. |
| 9,783,656 B2 | 10/2017 | Lehmann et al. |
| 9,845,391 B2 | 12/2017 | Lehmann et al. |
| 9,896,541 B2 | 2/2018 | Fiedel et al. |
| 2002/0161158 A1 | 10/2002 | Burkhart et al. |
| 2005/0136269 A1 | 6/2005 | Doehler et al. |
| 2007/0059539 A1 | 3/2007 | Doehler et al. |
| 2007/0128143 A1 | 6/2007 | Gruning et al. |
| 2007/0197678 A1 | 8/2007 | Cavaleiro et al. |
| 2007/0295243 A1 | 12/2007 | Dohler et al. |
| 2007/0299231 A1 | 12/2007 | Doehler et al. |
| 2008/0125503 A1 | 5/2008 | Henning et al. |
| 2008/0187702 A1 | 7/2008 | Ferenz et al. |
| 2009/0137752 A1 | 5/2009 | Knott et al. |
| 2010/0022435 A1 | 1/2010 | Henning et al. |
| 2010/0029587 A1 | 4/2010 | Bruckner et al. |
| 2010/0081781 A1 | 4/2010 | Schubert et al. |
| 2011/0301254 A1 | 8/2011 | Knott et al. |
| 2011/0230619 A1 | 9/2011 | Kuppert et al. |
| 2011/0306694 A1 | 12/2011 | Glos et al. |
| 2012/0068110 A1 | 3/2012 | Schubert et al. |
| 2012/0190760 A1 | 7/2012 | Henning et al. |
| 2012/0190762 A1 | 7/2012 | Hubei et al. |
| 2012/0282210 A1 | 11/2012 | Henning et al. |
| 2013/0041115 A1 | 2/2013 | Knott et al. |
| 2013/0259821 A1 | 3/2013 | Henning et al. |
| 2013/0213267 A1 | 8/2013 | Fiedel et al. |
| 2013/0245304 A1 | 9/2013 | Schubert et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2016/0130290 A1 | 5/2016 | Knott et al. |
| 2016/0130402 A1 | 5/2016 | Schubert et al. |
| 2016/0160009 A1 | 6/2016 | Ferenz et al. |
| 2017/0081469 A1 | 3/2017 | Fiedel et al. |
| 2017/0198099 A1 | 7/2017 | Knott |
| 2017/0226285 A1 | 8/2017 | Lobert et al. |
| 2017/0369619 A1 | 12/2017 | Doehler et al. |
| 2018/0009954 A1 | 1/2018 | Henning et al. |
| 2018/0016392 A1 | 1/2018 | Lobert et al. |

FOREIGN PATENT DOCUMENTS

| | | |
|---|---|---|
| EP | 0685425 A1 | 12/1997 |
| EP | 1382651 A1 | 1/2004 |
| EP | 1350804 A1 | 4/2004 |
| EP | 0940458 A1 | 7/2004 |
| EP | 1693359 A1 | 8/2006 |
| EP | 1897917 A1 | 3/2008 |
| EP | 3047845 B1 | 6/2017 |
| EP | 3263666 A1 | 3/2018 |
| WO | 0177240 A2 | 10/2001 |
| WO | 2002060621 A2 | 8/2002 |
| WO | 2013010747 A1 | 1/2013 |
| WO | 2013017365 A1 | 7/2013 |
| WO | 2017089068 A1 | 1/2017 |
| WO | 2017080747 A1 | 5/2017 |
| WO | 2017080749 A1 | 5/2017 |
| WO | 2017174272 A1 | 10/2017 |
| WO | 2018015152 A1 | 1/2018 |
| WO | 2018001687 A1 | 4/2018 |
| WO | 2018001889 A1 | 4/2018 |

OTHER PUBLICATIONS

German language Written Opinion dated Nov. 11, 2016 in PCT/EP2016/074554 (6 pages).

International Search Report dated Nov. 11, 2016 in PCT/EP2016/074554 (2 pages).

\* cited by examiner

CURABLE POLYMERS

This application is a national stage application under 35 U.S.C. § 371 of International Application No. PCT/EP2016/074554 filed 13 Oct. 2016, which claims priority to EP Application No. 15194027.7 filed 11 Nov. 2015, the disclosures of which are expressly incorporated herein by reference.

FIELD

The invention resides in the field of polymers, preferably of polysiloxanes. It relates in particular to the production of (meth)acrylate-bearing polysiloxanes and the application thereof for radiation-curing coatings.

BACKGROUND

Epoxides are highly versatile synthesis units in organic and macromolecular chemistry. The high ring strain of epoxides (>20 kcal/mol) is responsible for their good reactivity toward nucleophiles (ring opening) and thus provides a route to a series of interesting structures. In addition to amines, mercaptans and alcohols, carboxylic acids in particular find use as nucleophiles since this substance class is highly notable for being conveniently obtainable. However this very often requires the use of catalysts since carboxylic acids exhibit a lower nucleophilicity than, for example, the corresponding amines.

In addition to monomeric epoxides such as glycidyl acrylate or butyl glycidyl ether for example, polymeric epoxides such as inter alia polyglycidyl compounds of the bisphenol A type, epoxy-functional polymers of vinyl monomers but also epoxysiloxanes are indispensable to material science and industry.

Polysiloxanes comprising acrylic ester groups (acrylate groups) have hitherto proven themselves as high-energy-radiation-curable additives, for example for printing inks and for producing paint binders or for coatings for plastic, paper, wood and metal surfaces. Curing is preferably effected at low temperatures and induced by electron radiation or by UV radiation in the presence of prior art photoinitiators, for example benzophenone and derivatives thereof (EP 1897917).

A series of catalysts are suitable for epoxide ring opening with acids. A very wide variety of catalysts for the reaction of glycidyl compounds with carboxylic acids are thus known from coatings technology. This reaction is often used as a cross-linking reaction for curing paints for example. In addition to ammonium salts and phosphonium salts and amines and phosphines, certain metal compounds are also described. These catalysts known in the prior art often prove unselective and thus disadvantageous since they have the potential to break bonds in silicone chains for example and thus to bring about undesired side reactions such as molar mass decrease or skeletal rearrangement. These catalysts can moreover also trigger undesired side reactions at the silicone-bonded organic groups such as for instance homopolymerization of epoxy groups, conversion of carboxylic acids into amides or Michael additions of amines onto acrylate groups or else free-radical homopolymerization of acrylates, which can be triggered by a redox reaction with a great many metal compounds.

Mol Divers (2013) 17; 9-18 describes the use of ionic liquids such as butylmethylimidazolium bromide as catalyst for ring opening of epoxides with aliphatic and aromatic acids. This catalyst releases the strong acid HBr during the reaction so that acid-labile polymers such as siloxanes cannot be converted.

EP 1693359 describes catalysis with certain weakly Lewis-acidic borane compounds such as trisdimethylaminoborane. A flash point of −20° C. impedes handling so that the reaction is carried out at 70° C. leading to lengthy reaction times.

WO 0177240 describes the use of chromium salts for ring opening of epoxidized siloxanes with acrylic acid and subsequent use of these materials in UV-curable release coatings. Various solvents are used here which are said to ensure improved commixing of the catalyst with the epoxysiloxane.

SUMMARY

The present invention has for its object to make possible the provision of an economic production process for polymers, in particular (meth)acrylate-bearing polymers.

The object is achieved by the subject-matter of the present invention. This concerns a process for producing polymer materials (P), preferably polysiloxanes having at least one carboxylic ester group, in particular (meth)acrylate-bearing polysiloxanes, wherein the process is carried out in the presence of conversion products (C) of (A) and (B), wherein (A) are metal salts and (B) is a reaction product of aldehydes and primary amines. Both the formation of the conversion product (C) and the formation of the reaction product of aldehydes and primary amines to afford component (B) may optionally be effected in situ. The overall reaction can thus be carried out such that over the course thereof one or more reagents are formed which are further converted in the same mixture, for example initially component (B) may be formed, which in the same mixture with (A) is further converted into (C), in the presence of which the production of (P) can then be effected.

DETAILED DESCRIPTION

The term "(meth)acrylate" encompasses the derivatives, in particular esters, of methacrylic acid and/or acrylic acid.

This process makes possible a particularly economic production of polymers. A particular advantage of the process according to the invention is that less solvent, if any, need be employed. This results in an increase in the space-time yield. A further advantage of the process according to the invention is that the distillation time can be reduced. A further advantage of the process according to the invention is that the employed amount of metal salt, in particular the amount of chromium salt, can be reduced. A further advantage of the process according to the invention is a reduction in the filtration time can be achieved. Overall, a more economic production of polymers is achieved in any event.

The process according to the invention, the polymers according to the invention and preparations obtainable therewith as well as the use thereof are described hereinbelow by way of example without any intention that the invention be restricted to these illustrative embodiments. When ranges, general formulae or compound classes are specified hereinbelow, these shall encompass not just the corresponding ranges or groups of compounds that are explicitly mentioned but also all subranges and subgroups of compounds obtainable by extracting individual values (ranges) or compounds. Where documents are cited in the context of the present description, their content shall fully form part of the disclosure content of the present invention. References hereinbelow to percentages are, unless otherwise stated, weight percentages. In the case of compositions, the percentages are based on the entirety of the composition unless otherwise stated. Averages recited hereinbelow are number averages unless otherwise stated. Molar masses used are weight-average molar masses Mw unless expressly stated otherwise. Viscosity values recited in the context of this invention are, unless otherwise stated, dynamic viscosities which can be determined using methods familiar to those skilled in the art. Where measured values are recited hereinbelow, these measured values were determined at a pressure of 101 325 Pa and a temperature of 23° C. unless otherwise stated.

According to a preferred embodiment of the invention the process according to the invention has the feature that at least one epoxy-bearing polymer, preferably polysiloxane, is converted with one or more carboxylic acids, in particular comprising acrylic and/or methacrylic acid and/or other monocarboxylic acids, which are preferably free of double bonds capable of polymerization.

According to a preferred embodiment of the invention the polymers producible by the process according to the invention thus have the feature that they comprise at least one carboxylic ester group. The polymers obtained in accordance with the invention are preferably polymeric (poly) siloxanes.

In particular, the process according to the invention makes it possible to provide (meth)acrylate-bearing (poly)siloxanes according to formula (I)

$$M^1_{a1} M^2_{a2} M^3_{a3} D^1_{b1} D^2_{b2} D^3_{b3} T_c Q_d \quad (I)$$

where
$M^1 = [R^1_3 SiO_{1/2}]$
$M^2 = [R^2 R^1_2 SiO_{1/2}]$
$M^3 = [R^3 R^1_2 SiO_{1/2}]$
$D^1 = [R^1_2 SiO_{2/2}]$
$D^2 = [R^1 R^2 SiO_{2/2}]$
$D^3 = [R^1 R^3 SiO_{2/2}]$
$T = [R^1 SiO_{3/2}]$
$Q = [SiO_{4/2}]$
wherein
a1=0 to 50, preferably <10, in particular 2;
a2=0 to 50, preferably <10, in particular 0;
a3=0 to 50, preferably 1-30, in particular >0;
b1=10 to 5000, preferably 10 to 1000, in particular 10 to 500;
b2=0 to 50, preferably 0 to 25, in particular 0;
b3=0 to 50, preferably 0 to 25, in particular >0;
c=0 to 50, preferably 0 to 10, in particular 0;
d=0 to 50, preferably 0 to 10, in particular 0;
with the proviso that at least one of the indices a3 and b3 is greater than 0, preferably greater than 1;
$R^1$=independently of one another identical or different, linear or branched, saturated or unsaturated hydrocarbon radicals having 1 to 30 carbon atoms or aromatic hydrocarbon radicals having 6 to 30 carbon atoms, preferably alkyl radicals having 1 to 14 carbon atoms or monocyclic aromatics, further preferably methyl, ethyl, propyl or phenyl, in particular methyl;
$R^2$=independently of one another identical or different, linear or branched, saturated or unsaturated hydrocarbon radicals which may be substituted with nitrogen atoms or oxygen atoms, preferred hydrocarbons are alkyl radicals having 1 to 30 carbon atoms,
  which may be substituted with one or more hydroxyl functions and/or nitrogen-bearing groups,
    wherein the nitrogen-bearing groups may be present in quaternary form as ammonium groups
  which may be substituted with an epoxide group
  and/or which may be substituted with one or more carboxyl groups, amino acid groups, and/or betaine groups
or $R^2$ is an aryl radical having 6 to 30 carbon atoms
or $R^2$ is a polyoxyalkylene radical of formula (IV)

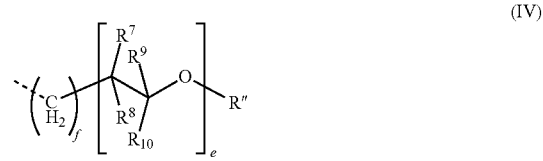

where
e is from 1 to 150, preferably 2 to 100, more preferably greater than 2, in particular 3 to 20,
f is 0 or 1,
$R^7$ or $R^8$ and also $R^9$ or $R^{10}$ are identically or else independently of one another hydrogen, monovalent alkyl radicals having 1 to 12 carbon atoms and/or aryl radicals having 6 to 12 carbon atoms,
which may optionally also be further substituted with hydroxyl, methoxy, ethoxy, methyl and/or ethyl groups,
  or $R^7$ and $R^9$ and also independently thereof $R^8$ and $R^{10}$ may together form a ring which includes the atoms to which $R^7$ and $R^9$ and also $R^8$ and $R^{10}$ are bonded,
  or $R^7$ and $R^8$ and also independently thereof $R^9$ and $R^{10}$ may together form a ring which includes the atoms to which $R^7$ and $R^8$ and also $R^9$ and $R^{10}$ are bonded,
  wherein these rings may optionally also be further substituted with hydroxyl groups, methoxy groups, ethoxy groups, methyl groups and/or ethyl groups and/or may be saturated and/or unsaturated,
wherein the individual fragments having the index e may differ from each other within the polyoxyalkylene radical of formula (IV) while forming a statistical distribution,
$R^2$ is preferably
—$CH_2$—$CH_2$—$CH_2$—O—($CH_2$—$CH_2$O—)$_x$—($CH_2$—CH($R^I$)O—)$_y$—$R^{II}$,
—$CH_2$—$CH_2$—O—($CH_2$—$CH_2$O—)$_x$—($CH_2$—CH($R^I$)O—)$_y$—$R^{II}$,
—$CH_2$—$CH_2$—$CH_2$—O—$CH_2$—CH(OH)—$CH_2$OH,
—$CH_2$—$CH_2$—(O))$_{x'}$—$CH_2$—$R^{IV}$, —$CH_2$—$R^{IV}$, or
—$CH_2$—$CH_2$—$CH_2$—O—$CH_2$—C($CH_2$OH)$_2$—$CH_2$—$CH_3$,
where
x=0 to 100, preferably >0, in particular 1 to 50,
x'=0 or 1,
y=0 to 100, preferably >0, in particular 1 to 50,
x+y is preferably from 1 to 50, more preferably greater than 1, in particular 2 to 20,
$R^{II}$=independently of one another hydrogen radical, substituted or unsubstituted $C_1$-$C_4$-alkyl, —C(O)NH—$R^I$, —C(O)O—$R^I$, —C(O)—$R^{III}$ where
$R^{III}$=substituted or unsubstituted $C_1$-$C_{12}$-alkyl-$CH_2$—O—$R^I$, substituted or unsubstituted $C_6$-$C_{12}$-aryl group,
preferably a benzyl group,
$R^I$=independently of one another substituted or unsubstituted $C_1$-$C_{12}$-alkyl, substituted or unsubstituted $C_6$-$C_{12}$-aryl group, substituted or unsubstituted $C_6$-$C_{30}$-alkaryl and
$R^{IV}$=$C_1$-$C_{50}$-alkyl, cyclic $C_3$-$C_{50}$-alkyl,
preferably $C_9$-$C_{45}$-alkyl, cyclic $C_9$-$C_{45}$—,
preferably $C_{13}$-$C_{37}$-alkyl, cyclic $C_{13}$-$C_{37}$-alkyl, $R^3$=independently of one another identical or different radicals of formula (II),

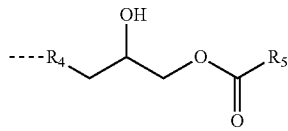

where
$R^4$=any desired organic, divalent radical bonded to the siloxane,
preferably substituted or unsubstituted $C_1$-$C_{30}$-alkylene, which may also be interrupted by heteroatoms and in case of interruption by nitrogen said nitrogen may also be quaternized, cyclic $C_3$-$C_{30}$-alkylene, substituted or unsubstituted $C_1$-$C_{30}$-alkyleneoxy, substituted or unsubstituted $C_6$-$C_{30}$-arylene, substituted or unsubstituted $C_6$-$C_{30}$-aryleneoxy, substituted or unsubstituted $C_1$-$C_{12}$-alkene-$C_6$-$C_{12}$-arylene which may also be interrupted by heteroatoms and in case of interruption by nitrogen said nitrogen may also be quaternized and bear sulfates, chlorides and carboxylates, in particular citrates, lactates, stearates and acetates as counterions,
$R^5$=hydrogen, substituted or unsubstituted $C_1$-$C_{30}$-alkyl, substituted or unsubstituted $C_1$-$C_{30}$-alkyl having one and/or more triple bonds, substituted or unsubstituted $C_1$-$C_{30}$-alkyl having one and/or more double bonds, substituted or unsubstituted $C_6$-$C_{30}$-aryl, substituted or unsubstituted $C_6$-$C_{30}$-heteroaryl, substituted or unsubstituted $C_1$-$C_{12}$-alk-$C_6$-$C_{12}$-aryl, substituted or unsubstituted $C_1$-$C_{30}$-alkyloxy, substituted or unsubstituted cyclic $C_3$-$C_{30}$-alkyl,
preferably methyl, vinyl and/or 1-methylvinyl.

It can be advantageous when in the polymers according to formula (I) to be produced in accordance with the invention a3=2 und b3=0.

In a further preferred embodiment of the invention the indices in formula (I) are defined as follows: a1=2, a2=0, a3=0, b1=10-500, b2=0, b3=3-25, c=0 and d=0.

Particularly preferred inventive polymers of formula (I) are linear polysiloxanes (c and d=0), preferably those having terminal (meth)acryloyl substituents. They correspond to formula (I) having the indices a1=0, a2=0, a3=2, b1=10-500, b2=0, b3=0, c=0 and d=0.

Particularly preferred inventive polymers are those of formula (I) where a3=0, b3=2-10, c and d=0, $R^4$=a propyloxy radical, $R^5$=a vinyl radical.

The various fragments of the siloxane chains indicated in formula (I) may form a statistical distribution or blockwise arrangement. Statistical distributions may have a blockwise construction with any number of blocks and any sequence or be subject to a randomized distribution, they may also have an alternating construction or else form a gradient along the chain, in particular they can also form any hybrid thereof. The indices used in formulae (I) and (IV) are to be regarded as numerical means of the statistical distributions mentioned.

Wherever molecules/molecule fragments have one or more stereocenters or can be differentiated into isomers on account of symmetries or can be differentiated into isomers on account of other effects e.g. restricted rotation, all possible isomers are included by the present invention.

Isomers are known to those skilled in the art. Where reference is made in the context of this invention to natural substances, for example lactate, this is generally to be understood as meaning all isomers, preference being given to the respective naturally occurring isomers and hence in the case referred to here to L-lactate.

As to the definition of natural products, reference is made to the scope of the "Dictionary of Natural Products", Chapman and Hall/CRC Press, Taylor and Francis Group, for example in the 2011 online edition: http://dnp.chemnetbase.com/.

The word fragment "poly" encompasses in the context of this invention not just compounds having three or more repeat units of one or more monomers in the molecule, but in particular also compositions of compounds which have a molecular weight distribution and the mean molecular weight of this distribution is at least 200 g/mol. This definition takes account of the fact that it is customary in the field of industry in question to refer to such compounds as polymers even if they do not appear to conform to a polymer definition as per OECD or REACH guidelines.

The index numbers recited herein and the value ranges for the indicated indices can be understood as average values for the possible statistical distribution of the actual existing structures and/or mixtures thereof. This also holds for structural formulae actually reproduced exactly as such, like for formula (I) and formula (IV) for example.

The process according to the invention provides in particular that one epoxy-bearing polymer, preferably polysiloxane, is converted with one or more carboxylic acids, in particular comprising acrylic and/or methacrylic acid and/or other monocarboxylic acids, which are preferably free of double bonds capable of polymerization.

Particularly suitable polyepoxide compounds are polyglycidyl compounds of the bisphenol A or bisphenol F type and also the perhydrogenated derivatives thereof or glycidyl ethers of polyfunctional alcohols such as butanediol, hexanediol, cyclohexanedimethanol, glycerol, trimethylolpropane or pentaerythritol.

It is likewise possible to employ epoxy-functional polymers of vinyl monomers, for example monofunctional acrylates, methacrylates or styrene, using a proportion of glycidyl methacrylate for example.

Especially suitable, however, are epoxysiloxanes, especially those described in DE 3820294 which is hereby incorporated by reference. Also included are cyclic epoxysiloxanes and/or epoxy-containing cycles having chain lengths of 3-8.

Suitable carboxylic acids are monofunctional or else difunctional or higher-functional carboxylic acids. Monocarboxylic acids contemplated include saturated and preferably unsaturated carboxylic acids such as benzoic acid, cyclohexanecarboxylic acid, 2-ethylhexanoic acid, caproic acid, caprylic acid, capric acid, lauric acid, natural and synthetic fatty acids, in particular acrylic acid, methacrylic acid, dimeric acrylic acid or crotonic acid. Suitable dicarboxylic acids are phthalic acid, isophthalic acid, tetrahydrophthalic acid, hexahydrophthalic acid, cyclohexanedicarboxylic acid, maleic acid, fumaric acid, malonic acid, succinic acid, glutaric acid, adipic acid, azelaic acid, pimelic acid, suberic acid, sebacic acid, dodecanedioic acid, and hydrogenated dimeric fatty acids. One particularly preferred monocarboxylic acid is acetic acid.

In the context of a preferred embodiment of the invention the process according to the invention is intended for producing (meth)acrylate-bearing polymers, in particular (meth)acrylate-bearing polysiloxanes, comprising at least one (meth)acrylic ester group and has the particular feature that at least one polysiloxane having an epoxy group or a plurality of epoxy groups, preferably a plurality of epoxy groups, is converted with one or more carboxylic acids. The conversion is preferably effected as an addition reaction.

In the context of a preferred embodiment the ratio of epoxy groups to carboxylic acids in the process according to the invention is 1:0.5-2, preferably 1:0.6-1.8, particularly preferably 1:0.8-1.5.

In the context of a preferred embodiment the process according to the invention may be carried out at a temperature of 10° C. to 200° C., preferably of 40° C. to 150° C., by preference of 80° C. to 140° C.

In the context of a preferred embodiment the process according to the invention may be carried out at a pressure of 0.5 to 20 bar, preferably 1 to 5 bar, especially preferably at atmospheric pressure.

The process according to the invention may be effected in the presence or in the absence of a solvent. Solvents contemplated include inter alia propanol, butanol, glycol, modified glycols, methyl isobutyl ketone, ethyl acetate, butyl acetate, toluene, xylene and isomers of xylene.

In the context of a preferred embodiment the process according to the invention has the feature that only small proportions of solvent need be employed. It is possible to employ <20 wt %, preferably <10 wt %, especially preferably <5 wt % of solvent based on the entirety of the reaction mixture. The process may in particular also be carried out in the absence of a solvent. To avoid premature polymerization, polymerization inhibitors known per se, for example hydroquinone, tert.-butylcatechol, di-tert-butylcresol, may optionally be added in efficacious amounts during the ring-opening addition.

The conversion according to the invention may be carried out either in daylight or else with exclusion of light, preferably in daylight.

The conversion according to the invention may be carried out either under inert conditions (nitrogen, argon) or else under an oxygen and/or air atmosphere, preferably under an air atmosphere. Conversion under an oxygen-depleted atmosphere, for example a nitrogen atmosphere comprising <10 vol % of oxygen, is preferred.

The process according to the invention is moreover carried out in the presence of conversion products (C) of (A) and (B), wherein (A) are metal salts and (B) is a reaction product of aldehydes and primary amines.

The term "conversion product (C)" encompasses the result of interactions between (A) and (B) that lead to conversions of matter. The conversion product (C) may also be formed in situ, i.e. the process for producing polymer materials (P) is effected in the presence of (A) and (B), wherein these are able to interact and thus can form a conversion product.

In the context of a preferred embodiment the conversion product (C) is employed in amounts of 0.001% to 5%, preferably 0.01% to 1%, particularly preferably 0.01% to 0.5%.

Metal salts that may be advantageously used are salts of doubly or triply positively charged metals of transition groups 3 to 12, particularly metals of transition group 6, in particular salts of chromium such as, for example, chromium (III) bromide, chromium (II) chloride, chromium(III) chloride, chromium(III) fluoride, chromium(III) nitrate, chromium(III) perchlorate, chromium(III) phosphate, chromium (III) sulfate, chromyl chloride, chromium oxide, potassium chromium(III) oxalate, chromium(III) acetate. It is further in accordance with a preferred embodiment for the metal salts to preferably comprise chromium(III) salts, in particular chromium(III) acetate. These chromium salts may be in the hydrate form and/or free of water.

(B) is a reaction product of aldehyde and primary amine, in particular a so-called Schiff base. The reaction product of aldehyde and primary amine may also be formed in situ, i.e. the process for producing polymer materials (P) is effected in the presence of (A) and (B), which may also be formed in situ, wherein (A) and (B) are able to interact and thus can form a conversion product.

Aldehydes that may be advantageously used are aliphatic and/or aromatic aldehydes, preferably aromatic aldehydes, by preference hydroxyl-bearing aldehydes, particularly preferably phenol-bearing aldehydes, in particular salicylaldehyde.

Primary amines that may be employed are primary mono- or polyamines such as, for example, substituted or unsubstituted $C_1$-$C_{30}$-alkylamine, substituted or unsubstituted $C_1$-$C_{30}$-alkylamine having one and/or more triple bonds, substituted or unsubstituted $C_1$-$C_{30}$-alkylamine having one and/or more double bonds, substituted or unsubstituted $C_6$-$C_{30}$-arylamine, substituted or unsubstituted $C_6$-$C_{30}$-heteroarylamine, substituted or unsubstituted $C_1$-$C_{12}$-alk-$C_6$-$C_{12}$-arylamine, substituted or unsubstituted $C_1$-$C_{30}$-alkyloxyamine, substituted or unsubstituted cyclic $C_3$-$C_{30}$-alkylamine, preferably fatty amines and fatty alcohol amines, especially preferably primary fatty alcohol amines, obtainable from (preferably straight-chain) saturated or (preferably straight-chain) unsaturated fatty alcohols and addition onto acrylonitrile and subsequent hydrogenation.

The term "fatty amine" is known to those skilled in the art. A fatty amine is a long-chain amine derived from the respective fatty acid having at least one carbon chain having >8 carbon atoms, for example 8-24 carbon atoms. The names of fatty amines often derive from the fat employed, for example cocoamine (coconut fatty amine), tallowamine (tallow fatty amine) etc.

It is known to those skilled in the art that the reaction of an aldehyde and an amine is a condensation reaction where water is formed as the reaction product. The aldehyde and the amine may advantageously be blended in a ratio of 1:2, preferably 1:1.5, particularly preferably 1:1, optionally with the aid of an entraining and/or drying agent which removes the water from the reaction mixture. Possible drying agents are magnesium sulfate, sodium sulfate, zeolites, molecular sieves etc. and possible entraining agents are any organic solvents that form an azeotrope with water. These include inter alia aliphatic and also aromatic alkanes, for example hexane, cyclohexane, toluene etc. It is alternatively possible to employ a solvent such as, for example, ethanol, propanol, butanol, tetrahydrofuran, dioxane, methyl tetrahydrofuran, methyl ethyl ketone, methyl isobutyl ketone, ethyl acetate.

The thus prepared reaction products (B) of aldehyde and amine, in particular Schiff bases, or solutions thereof in organic solvents may still contain residues of the employed aldehydes and/or amine. Based on (B), up to 10 wt %, preferably less than 8 wt %, more preferably less than 5 wt % and in particular less than 5 wt % of aldehyde and/or amine may be present.

A residual content within the abovementioned limits or an addition of amine may in some cases be advantageous in the conversion with the epoxy-functional polysiloxanes.

The inventive production of the conversion product (C) of (A) and (B) is advantageously carried out such that the molar ratio of (A) to (B) is 1:5, preferably 1:3, especially preferably 1:2.

The conversion according to the invention for producing the conversion product (C) may be carried out at a temperature of 10° C. to 200° C., preferably of 20° C. to 150° C., by preference of 25° C. to 100° C.

The conversion according to the invention for producing the conversion product (C) may preferably be carried out at a pressure of 0.5 to 20 bar, preferably 1 to 5 bar, especially preferably at atmospheric pressure.

The conversion according to the invention for producing the conversion product (C) may preferably be carried out at pH 2 to 12, preferably pH 4 to 10, particularly preferably pH 5 to 8.

The conversion according to the invention for producing the conversion product (C) may be carried out in the presence or in the absence of a solvent. The conversion is preferably effected in the presence of polar and protic solvents such as methanol, ethanol, propanol, butanol, glycol, modified glycols.

The conversion according to the invention for producing the conversion product (C) may be carried out either in daylight or else with exclusion of light, preferably in daylight.

The conversion according to the invention for producing the conversion product (C) may be carried out either under inert conditions (nitrogen, argon) or else under an oxygen and/or air atmosphere, preferably under an air atmosphere.

As a further substep in the production of the conversion product (C) a subsequent distillation/purification of the conversion products may be advantageous. The distillation/purification may be effected with the aid of a rotational evaporator for example, preferably at a temperature of 20° C. to 250° C., by preference 40° C. to 180° C. and particularly preferably 50° C. to 150° C. The pressure here is preferably 0 to 0.02 bar, by preference more than 0 to 0.1 bar and particularly preferably 0.000001 to 0.001 bar. The distillation/workup may in particular be advantageous for removing solvents.

The obtained conversion products (C) of (A) and (B) may be used directly or worked up. The workup may be effected, for example, by means of extraction and subsequent filtration, optionally using filtration aids. Solvents of the process according to the invention that are suitable for extraction are water or organic solvents or single-phase or multiphase mixtures thereof. Suitable organic solvents include, for example, ethyl acetate, butyl acetate, ethyl methyl ketone, xylene, toluene, chloroform, dichloromethane, hexane, petroleum ether, diethyl ether, polyethers or ionic liquids.

The process according to the invention for producing polymer materials (P) may preferably be carried out such that it comprises three process steps, namely 1. producing a reaction product B, in particular a Schiff base (1st process step), and 2. converting the reaction product B, in particular the Schiff base, with a metal salt to obtain the conversion product (C) (2nd process step) and 3. producing a carboxylic-ester-containing polymer in the presence of the conversion product (C) (3rd process step). This corresponds to a preferred embodiment of the invention.

All three process steps of the abovementioned preferred embodiment of the invention (producing a reaction product (B), in particular a Schiff base (1st process step), converting the reaction product B, in particular the Schiff base, with a metal salt (2nd process step) and producing a carboxylic-ester-containing polymer (3rd process step)), may be carried out in the process according to the invention either as a one-pot reaction, as consecutive steps carried out separately, or else under metering control, but preferably as a one-pot reaction. The reaction may be carried out in a batch, semi-batch or continuous process. Especial preference is given to a one-pot reaction for reaction steps 2 and 3. Here, the conversion product C is produced "in situ" and then provided directly for process step 3. In this connection "in situ" is to be understood as meaning the production of a starting compound and the immediate further use thereof in the same reaction vessel.

Particularly the carboxylic-ester-containing polymers obtainable in accordance with the invention and comprising at least one carboxylic ester group can be used, for example, for producing preparations according to the invention. The compositions according to the invention have the feature that they comprise the inventive carboxylic-ester-containing polymers comprising at least one carboxylic ester group. The compositions according to the invention can comprise further added substances such as, for example, siccatives, flow control agents, colors and/or color pigments, wetting agents, binders, reactive diluents, surfactants, thermally activatable initiators, photoinitiators, catalysts, emollients, emulsifiers, antioxidants, hydrotropes (or polyols), solid and filler materials, pearl luster additives, insect repellents, antifoulants, nucleators, preservatives, optical brighteners, flame retardants, antistats, blowing agents, plasticizers/softeners, perfumes, active ingredients, care additives, superfatting agents, solvents and/or viscosity modulators. Preferred additions are colors and/or color pigments.

The present invention further provides a polymer, preferably curable polymer, in particular curable (meth)acrylate-bearing polysiloxane, produced according to a process as described hereinabove. Reference is made in particular to the preceding preferred embodiments which are also advantageously applicable to the polymer according to the invention. It is preferable in accordance with the present invention when the curable polymer is a radiation-curing polymer, in particular a UV-curing polymer. UV-curable means that the action of UV radiation converts reactive materials from a low molecular weight state into a high molecular weight state.

The present invention further provides a conversion product formed by conversion of chromium salts, preferably chromium(III) salts, in particular chromium(III) acetate, and a reaction product of aldehydes and fatty amines. Reference is made in particular to the preceding preferred embodiments.

The present invention further provides for the use of the abovementioned conversion product as catalyst in the production of polymer, preferably curable polymer, in particular curable (meth)acrylate-bearing siloxane, advantageously in the production of polymer as described hereinabove. Reference is made in particular to the preceding preferred embodiments.

The present invention further provides for the use of the polymers according to the invention, preferably of curable polymer, in particular of curable (meth)acrylate-bearing polysiloxane, in particular producible as described hereinabove, as a release coating alone or in admixture with further additives such as, preferably, curing initiators, fillers, pigments, other siloxanes and/or acrylate systems and/or further added substances, in particular in admixture with further acrylated silicones.

The present invention further provides a process for coating sheetlike carriers by application of curable polymer according to the invention, in particular curable (meth)acrylate-bearing polysiloxane as described hereinabove or producible as described hereinabove.

The invention further provides for the use of the (meth)acrylate-bearing polysiloxanes according to the invention as radiation-curable adhesive coatings for sheetlike carriers. The products according to the invention may be directly used as such. It is necessary only in the case of UV curing to add a free-radical starter to the (meth)acrylate-bearing polysiloxanes. Addition is effected, for example, in amounts of 2 to 5 wt % based on siloxane.

The free-radical starter should be chosen based on the wavelength spectrum of the radiation source used for curing. Such free-radical starters are known. Examples of such free-radical starters include benzophenone and the oximes or benzoin ethers thereof.

The thus obtained coating materials can also be modified in a manner known per se by addition of further products. Such known modifiers are siloxanes having groups which are chemically incorporated into the coating material during curing thereof. Particularly suitable modifiers are siloxanes having hydrogen atoms bound to silicon atoms. These can inter alia bring about a reduction in the viscosity of the coating material, thus improving its coatability onto sheet-like carriers.

It is further possible to add to the coatings further additive agents which are enveloped by the coating material as inert substances during curing. Examples of such substances distributed in the coating material include finely divided silica or polymers of fluorocarbons.

The invention further provides radiation-curing coating materials comprising
 (i) polymer according to the invention, preferably curable polymer, in particular curable (meth)acrylate-bearing polysiloxane, in particular producible as described hereinabove,
 (ii) and additions,
 wherein the additions are selected from photoinitiators, photosensitizers, fillers, pigments, solvents, phosphorus-containing compounds which polymerize under UV light, stabilizers, e.g. phosphites or hindered amine light stabilizers (HALS), anti-misting additives and amine synergists,
in particular in admixture with further acrylated silicones.

Exemplary Embodiments

General Methods and Materials
NMR:
The acquisition and interpretation of NMR spectra is known to those skilled in the art ("NMR Spectra of Polymers and Polymer Additives", A. Brandolini and D. Hills, 2000, Marcel Dekker. Inc.).

The Spectra were acquired with a Bruker Spectrospin spectrometer at room temperature, the measuring frequency during acquisition of the proton spectra was 400 MHz.
Viscosity:
Viscosities were determined with a Brookfield Synchro-Lectric (type LVT) rotational viscometer and spindle LV 2 in line with DIN 5391.
Materials:
Adogen® 163 D is a primary distilled laurylamine, Adogen® 172 D is a distilled primary oleylamine of plant origin, Adogen® 160 D is a distilled primary amine derived from coconut fatty acid. TEGO® RC 711 is a modified silicone acrylate. All are products of Evonik Industries AG.

Synthesis Example 1

71.4 g of salicylaldehyde (Aldrich) were dissolved in 200 ml of toluene. 100 g of Adogen 163 D (Evonik Industries, nitrogen content: 7.5%) were then added and the mixture was heated to reflux temperature. After 1 hour a Dean-Stark apparatus was connected and the mixture was stirred for a further 3 hours. After removal of the reaction water, distillation was effected on a rotary evaporator at 70° C. and <1 mbar. The $^1$H NMR spectrum revealed complete conversion of the aldehydes groups to the corresponding Schiff bases.

Synthesis Example 2

43.6 g of salicylaldehyde (Aldrich) were dissolved in 200 ml of toluene. 100 g of Adogen 172 D (Evonik Industries, nitrogen content: 5.0%) were then added and the mixture was heated to 90° C. After 2.5 hours a Dean-Stark apparatus was connected and the mixture was stirred for a further 3 hours. After removal of the reaction water, distillation was effected on a rotary evaporator at 70° C. and <1 mbar. The $^1$H NMR spectrum revealed complete conversion of the aldehydes groups to the corresponding Schiff bases.

Synthesis Example 3

61.1 g of salicylaldehyde (Aldrich) were dissolved in 200 ml of toluene. 100 g of Adogen 160 D (Evonik Industries, nitrogen content: 7.0%) were then added and the mixture was heated to 90° C. After 2.5 hours a Dean-Stark apparatus was connected and the mixture was stirred for a further 3 hours. After removal of the reaction water, distillation was effected on a rotary evaporator at 70° C. and <1 mbar. The $^1$H NMR spectrum revealed complete conversion of the aldehydes groups to the corresponding Schiff bases.

Synthesis Example 4

20 g of the Schiff base from synthesis example 1 was initially charged in 200 ml of ethanol. At room temperature 16.4 g of aqueous chromium(III) acetate solution (50% in water) were added. The clear, dark-green solution was heated to reflux temperature (about 80° C.) for six hours. The solvent was then removed via a distillation at 100° C. on a rotary evaporator (<1 mbar). A green/brownish paste-like liquid is formed. The chromium content is 6.7%

Synthesis Example 5

20 g of the Schiff base from synthesis example 2 was initially charged in 200 ml of ethanol. At room temperature 11.8 g of aqueous chromium(III) acetate solution (50% in water) were added. The clear, dark-green solution was heated to reflux temperature (about 80° C.) for six hours. The solvent was then removed via a distillation at 100° C. on a rotary evaporator (<1 mbar). A green/brownish paste-like liquid is formed. The chromium content is 5.5%

Synthesis Example 6

20 g of the Schiff base from synthesis example 3 was initially charged in 200 ml of ethanol. At room temperature 14.9 g of aqueous chromium(III) acetate solution (50% in water) were added. The clear, dark-green solution was heated to reflux temperature (about 80° C.) for six hours. The solvent was then removed via a distillation at 100° C. on a rotary evaporator (<1 mbar). A green/brownish paste-like liquid is formed. The chromium content is 6.7%

Synthesis Example 7

In a heatable glass flask fitted with a mechanical stirrer, thermometer and gas inlet, 227.7 g of lateral epoxysilane (Evonik Industries AG, epoxy content: 1.37%), 0.05 g of methylhydroquinone, 0.05 g of para-methoxyphenol, 0.12 g of the conversion product from synthesis example 4 and finally 15.2 g of acrylic acid (Aldrich) were initially charged together with 0.8 g of acetic acid (Baker) and heated to 120° C. with stirring and gas introduction (air). The acid number and thus the conversion were then determined by means of a withdrawn sample. At a reaction time of 4 hours and a conversion of >99% the batch was cooled, filtered and, in a rotary evaporator at 120° C. (<1 mbar), freed of excess residual acrylic acid. The $^1$H NMR spectrum and the $^{29}$Si NMR spectrum revealed virtually complete conversion of the epoxy groups to the corresponding carboxylic esters; viscosity: 745 mPa*s.

Synthesis Example 8

In a heatable glass flask fitted with a mechanical stirrer, thermometer and gas inlet, 228.6 g of terminal epoxysilane (Evonik Industries AG, epoxy content: 1.47%), 0.03 g of methylhydroquinone, 0.03 g of para-methoxyphenol, 0.12 g of the conversion product from synthesis example 5 and finally 17.4 g of acrylic acid (Aldrich) were initially charged and heated to 115° C. with stirring and gas introduction (air). The acid number and thus the conversion were then determined by means of a withdrawn sample. At a reaction time of 5 hours and a conversion of >99% the batch was cooled, filtered and, in a rotary evaporator at 120° C. (<1 mbar), freed of excess residual acrylic acid. The $^1$H NMR spectrum and the $^{29}$Si NMR spectrum revealed virtually complete conversion of the epoxy groups to the corresponding carboxylic esters; viscosity: 99 mPa*s.

Synthesis Example 9

In a heatable glass flask fitted with a mechanical stirrer, thermometer and gas inlet, 227.7 g of epoxysilane from synthesis example 7, 0.05 g of methylhydroquinone, 0.05 g of para-methoxyphenol, 0.12 g of the conversion product from synthesis example 6 and finally 12.7 g of acrylic acid (Aldrich) were initially charged and heated to 120° C. with stirring and gas introduction (air). The acid number and thus the conversion were then determined by means of a withdrawn sample. At a reaction time of 4 hours and a conversion of >85% the batch was cooled and filtered. The $^1$H NMR spectrum and the $^{29}$Si NMR spectrum revealed a conversion of the epoxy groups to the corresponding carboxylic esters of 87% (due to the reduced amount of acid this corresponds to a conversion of about 97%); viscosity: 581 mPa*s.

Synthesis Example 10

In a heatable glass flask fitted with a mechanical stirrer, thermometer and gas inlet, 227.7 g of epoxysilane from synthesis example 7, 0.05 g of methylhydroquinone, 0.05 g of para-methoxyphenol, 0.06 g of aqueous chromium(III) acetate solution (50% in water), 0.26 g of the Schiff base from synthesis example 1 and finally 15.2 g of acrylic acid (Aldrich) were initially charged together with 0.8 g of acetic acid (Baker) and heated to 120° C. with stirring and gas introduction. The acid number and thus the conversion were then determined by means of a withdrawn sample. At a reaction time of 6 hours and a conversion of >99% the batch was cooled, filtered and distilled at 120° C. The 1H NMR spectrum and the $^{29}$Si NMR spectrum revealed virtually complete conversion of the epoxy groups to the corresponding carboxylic esters; viscosity: 768 mPa*s.

Synthesis Example 11

In a heatable glass flask fitted with a mechanical stirrer, thermometer and gas inlet, 228.6 g of epoxysilane from synthesis example 8, 0.02 g of methylhydroquinone, 0.02 g of para-methoxyphenol, 0.06 g of aqueous chromium(III) acetate solution (50% in water), 0.24 g of the Schiff base from synthesis example 2 and finally 17.4 g of acrylic acid (Aldrich) were initially charged and heated to 115° C. with stirring and gas introduction. The acid number and thus the conversion were then determined by means of a withdrawn sample. At a reaction time of 4 hours and a conversion of >99% the batch was cooled, filtered and distilled at 120° C. The $^1$H NMR spectrum and the $^{29}$Si NMR spectrum revealed virtually complete conversion of the epoxy groups to the corresponding carboxylic esters; viscosity: 98 mPa*s.

Synthesis Example 12

In a heatable glass flask fitted with a mechanical stirrer, thermometer and gas inlet, 227.7 g of epoxysilane from synthesis example 7, 0.05 g of methylhydroquinone, 0.05 g of para-methoxyphenol, 0.06 g of aqueous chromium(III) acetate solution (50% in water), 0.19 g of the Schiff base from synthesis example 3 and finally 15.2 g of acrylic acid (Aldrich) were initially charged and heated to 120° C. with stirring and gas introduction. The acid number and thus the conversion were then determined by means of a withdrawn sample. At a reaction time of 5 hours and a conversion of >85% the batch was cooled and filtered. The $^1$H NMR spectrum and the $^{29}$Si NMR spectrum revealed a conversion of the epoxy groups to the corresponding carboxylic esters of 87% (due to the reduced amount of acid this corresponds to a conversion of about 97%); viscosity: 600 mPa*s.

Synthesis Example 13

In a heatable glass flask fitted with a mechanical stirrer, thermometer and gas inlet, 227.7 g of epoxysiloxane from synthesis example 7, 0.05 g of methylhydroquinone, 0.05 g of para-methoxyphenol, 0.24 g of chromium(III) chloride hexahydrate (Aldrich), 0.1 g of the Schiff base from synthesis example 3 and finally 15.2 g of acrylic acid (Aldrich) with 0.8 g of acetic acid (Baker) were initially charged and heated to 120° C. with stirring and gas introduction (air). The acid number and thus the conversion were then determined by means of a withdrawn sample. At a reaction time of 9 hours and a conversion of >99% the batch was cooled and filtered. The $^1$H NMR spectrum and the $^{29}$Si NMR spectrum revealed virtually complete conversion of the epoxy groups to the corresponding carboxylic esters; viscosity: 760 mPa*s.

Synthesis Example 14

In a heatable glass flask fitted with a mechanical stirrer, thermometer and gas inlet, 292 g of epoxysiloxane from synthesis example 7, 0.06 g of methylhydroquinone, 0.06 g of para-methoxyphenol, 0.16 g of chromium(II) chloride (Aldrich), 1.2 g of the Schiff base from synthesis example 3 and finally 19.5 g of acrylic acid (Aldrich) with 1.0 g of acetic acid (Baker) were initially charged and heated to 120° C. with stirring and gas introduction (air). The acid number and thus the conversion were then determined by means of a withdrawn sample. At a reaction time of 3 hours and a conversion of >99% the batch was cooled and filtered. The $^1$H NMR spectrum and the $^{29}$Si NMR spectrum revealed virtually complete conversion of the epoxy groups to the corresponding carboxylic esters; viscosity: 831 mPa*s.

Synthesis Example 15

In a heatable glass flask fitted with a mechanical stirrer, thermometer and gas inlet, 235 g of epoxysiloxane from synthesis example 8, 0.02 g of methylhydroquinone, 0.02 g of para-methoxyphenol, 0.06 g of ruthenium(III) acetate (Strem), 1.2 g of the Schiff base from synthesis example 2 and finally 17.4 g of acrylic acid (Aldrich) were initially charged and heated to 115° C. with stirring and gas introduction (air). The acid number and thus the conversion were then determined by means of a withdrawn sample. At a reaction time of 12 hours and a conversion of >97% the batch was cooled, filtered and distilled at 120° C. The $^1$H NMR spectrum and the $^{29}$Si NMR spectrum revealed virtually complete conversion of the epoxy groups to the corresponding carboxylic esters; viscosity: 110 mPa*s.

Comparative Example 1

In a heatable glass flask fitted with a mechanical stirrer, thermometer and gas inlet, 227.7 g of epoxysilane from synthesis example 7, 0.02 g of methylhydroquinone, 0.02 g of para-methoxyphenol, 0.49 g of aqueous chromium(III) acetate solution (50% in water) and finally 15.2 g of acrylic acid (Aldrich) were initially charged together with 0.8 g of acetic acid (Baker) and heated to 120° C. with stirring and gas introduction (air). The acid number and thus the conversion were then determined by means of a withdrawn sample. After 16 hours of reaction time the batch was aborted at a conversion of 93%, cooled, filtered and distilled at 120° C. The $^1$H NMR spectrum and the $^{29}$Si NMR spectrum revealed a conversion of the epoxy groups to the corresponding carboxylic esters of 91%; viscosity: 1026 mPa*s.

Comparative Example 2

In a heatable glass flask fitted with a mechanical stirrer, thermometer and gas inlet, 227.7 g of epoxysilane from synthesis example 7, 0.05 g of methylhydroquinone, 0.05 g of para-methoxyphenol, 0.26 g of the Schiff base from synthesis example 2 and finally 15.2 g of acrylic acid (Aldrich) were initially charged together with 0.8 g of acetic acid (Baker) and heated to 120° C. with stirring and gas introduction. The acid number and thus the conversion were then determined by means of a withdrawn sample. After 12 hours of reaction time the batch was aborted at a conversion of 70%, cooled, filtered and distilled at 120° C. The $^1$H NMR spectrum and the $^{29}$Si NMR spectrum revealed a conversion of the epoxy groups to the corresponding carboxylic esters of 57%; viscosity: 2679 mPa*s.

Comparative Example 3

In a heatable glass flask fitted with a mechanical stirrer, thermometer and gas inlet, 227.7 g of epoxysilane from synthesis example 7, 0.05 g of methylhydroquinone, 0.05 g of para-methoxyphenol, 0.15 g of Adogen 163 D and finally 15.2 g of acrylic acid (Aldrich) were initially charged together with 0.8 g of acetic acid (Baker) and heated to 120° C. with stirring and gas introduction. The acid number and thus the conversion were then determined by means of a withdrawn sample. After 12 hours of reaction time the batch was aborted at a conversion of 67%, cooled, filtered and distilled at 120° C. The $^1$H NMR spectrum and the $^{29}$Si NMR spectrum revealed a conversion of the epoxy groups to the corresponding carboxylic esters of 55%; viscosity: 3390 mPa*s.

Comparative Example 4

In a heatable glass flask fitted with a mechanical stirrer, thermometer and gas inlet, 227.7 g of epoxysilane from synthesis example 8, 0.02 g of methylhydroquinone, 0.02 g of para-methoxyphenol, 0.49 g of aqueous chromium(III) acetate solution (50% in water) and finally 17.4 g of acrylic acid (Aldrich) were initially charged and heated to 120° C. with stirring and gas introduction (air). The acid number and thus the conversion were then determined by means of a withdrawn sample. After 15 hours of reaction time the batch was aborted at a conversion of 70%, cooled, filtered and distilled at 120° C. The $^1$H NMR spectrum and the $^{29}$Si NMR spectrum revealed a conversion of the epoxy groups to the corresponding carboxylic esters of 68%; viscosity: 324 mPa*s.

Performance Testing:

Performance testing of synthesis examples 7 to 12 and comparative examples 1 to 3 was effected as a release coating. Release coatings are known in the prior art, preferably adhesive coatings on sheetlike carriers, for use in adhesive tapes or label laminates.

The release coatings were produced by blending 68 g of each of synthesis examples 7 to 12 and the comparative examples 1 to 3 with 30 g of TEGO® RC 711 and 2 g of the photoinitiator TEGO® A18 from Evonik Industries AG. TEGO® RC 711 is generally recommended as an adhesion component. The coating materials were stirred manually with a spatula until there was no longer any visible inhomogeneity.

The coating materials were applied to a sheetlike carrier. In all examples said carrier was a BOPP (oriented polypropylene) film of 50 cm in width that had previously been subjected to corona pretreatment with a generator output of 1 kW. The coating materials were applied using a 5-roll coating unit from COATEMA® Coating Machinery GmbH, Dormagen, Germany with a weight per unit area of about 1 g/m$^2$ and were cured by the action of UV light from a medium-pressure mercury vapor lamp from IST® Metz GmbH, Nürtingen, Germany at 60 W/cm and at a lineal speed of 100 m/min under a nitrogen atmosphere with a residual oxygen content of less than 50 ppm.

The release coatings were subjected to rub-off, release value and subsequent adhesion testing.

Rub-off: The adhesion of the cured coating to the carrier material is tested by vigorous rubbing with the thumb on the coating. In the event of insufficient adhesion, rubberlike crumbs are formed. Even intense rubbing shall not produce such crumbs. The test is carried out by a trained panel. The evaluation is categorized into grades from 1 to 3, where 3 is inadequate.

Grade of 1=very good scratch resistance and anchorage to the substrate. No crumbs detectable with linear and subsequent circular movement at the same location.

Grade of 2=sufficient scratch resistance and adhesion to the substrate. Linear movement generates no crumbs but subsequent circular movement at same location forms crumbs.

Grade of 3=insufficient scratch resistance and adhesion. Even linear movement generates crumbs.

Release values: The release values are determined as per test protocol FTM 10 in FINAT Handbook 8th Edition, The Hague/NL, 2009 with the exception that storage is carried out under pressure at 40° C. The adhesive tapes employed were TESA®7475 and TESA®7476, both trade marks of tesa SE, Hamburg, Germany. Release values depend on the adhesive tape under test, on the silicone and on the curing of the silicone. Compared to a well crosslinked silicone of similar construction, a poorly crosslinked silicone release coating generates release values that are clearly too low.

Subsequent adhesion: Subsequent adhesion is determined as per test protocol FTM 11 in FINAT Handbook 8th Edition, The Hague/NL, 2009 with the exception that the storage of the test adhesive strip in silicone contact is carried out for one minute and the standard surface is an untreated BoPP surface. The adhesive tape employed was TESA®7475, a trade mark of tesa SE, Hamburg, Germany. Subsequent adhesion is a measure of the crosslinking of the silicones. If nonpolymerized and thus migratable silicone constituents are present, subsequent adhesion values decrease with increasing proportion of such components. Values above 80% are regarded as acceptable.

The results for synthesis conversion (determined by acid number), viscosity, rub-off tests, release values and subsequent adhesion are reported in table 1:

TABLE 1

Results

| Synthesis example | Reaction time [h] | Conversion [%] | Viscosity: [mPas] | Rub-off | RV (TESA 7475) [cN/2.5 cm] | RV (TESA 7476) [cN/2.5 cm] | SA [%] |
|---|---|---|---|---|---|---|---|
| 7 | 4 | >99 | 754 | 1 | 7 | 52 | 91 |
| 8 | 5 | >99 | 99 | 1 | 13 | 98 | 99 |
| 9 | 4 | 87 | 851 | 1 | 7 | 40 | 84 |
| 10 | 6 | >99 | 768 | 1 | 7 | 48 | 91 |
| 11 | 4 | >99 | 98 | 1 | 14 | 96 | 94 |
| 12 | 5 | 87 | 600 | 1 | 6 | 40 | 85 |
| 13 | 9 | >99 | 760 | 1 | 8 | 44 | 92 |
| 14 | 3 | >99 | 831 | 1 | 9 | 48 | 87 |
| 15 | 12 | >97 | 110 | 1 | 16 | 96 | 86 |
| Comparative 1 | 16 | 92 | 1026 | 2 | 7 | 41 | 80 |
| Comparative 2 | 12 | 70 | 2679 | 3 | 3 | 30 | 61 |
| Comparative 3 | 12 | 67 | 3390 | 3 | 3 | 25 | 56 |
| Comparative 4 | 15 | 70 | 324 | 3 | 7 | 70 | 68 |

Conversion according to NMR in %;
viscosity in mPas, rub-off (notes 1 to 3);
release values (RV) with two adhesives in cN/2.5 cm after 24 hours of storage at 40° C.;
subsequent adhesion (SA) in %.

The advantages of the invention are clearly apparent from table 1. Thus, the noninventive comparative examples 1 to 4 exhibit an increased viscosity compared to the synthesis examples. This can be verified with reference to the synthesis examples 8, 11 and 15 which have a viscosity of 99, 98 and 110 mPa*s respectively and the accompanying comparative example which has a viscosity of 324 mPa*s. In addition to the disadvantageously increased viscosity the product from comparative example 4 exhibits a substantially increased reaction time and an incomplete conversion which results in poor release values and subsequent adhesion values. Furthermore, synthesis example 15 shows that in addition to chromium salts, further metal salts may also be used. Synthesis examples 7, 9, 10, 12, 13 and 14 and the accompanying comparative examples 1, 2 and 3 describe a similar picture. While the synthesis examples exhibit a viscosity of about 600 to 900 mPa*s and complete conversion after about 4 to 6 hours, the values for the comparative examples are about 1000 to about 3400 mPa*s at reaction times of 12 to 16 hours with poor conversions which result in poor release values and subsequent adhesion values. The rub-off values too reflect the poor conversions of the comparative examples. It can also be seen from synthesis examples 13 and 14 that the invention is not only limited to chromium acetate salts. The conversions for synthesis examples 9 and 12 are to be understood as absolute values. Based on the reduced amount of acid employed the values correspond to a conversion of about 97%.

The invention claimed is:

1. A process for producing a polysiloxane having a carboxylic acid ester group, wherein at least one epoxy group bearing polysiloxane is reacted with one or more carboxylic acids to convert to the polysiloxane having a carboxylic acid ester group in the presence of conversion products (C) of (A) and (B), wherein (A) are metal salts and (B) is a reaction product of aldehydes and primary amines, wherein metal salts include salts of di- or triply positively charged metals of subgroups 3 to 12.

2. The process according to claim 1, wherein the one or more carboxylic acids are selected from acrylic acid, methacrylic acid and a combination thereof, the polysiloxane having a carboxylic acid ester group free of double bonds capable of polymerization.

3. The process according to claim 2, wherein a ratio of epoxy groups to carboxylic acids of 1:0.5-2.

4. The process according to claim 1, wherein the metal salts (A) comprise chromium salts.

5. The process according to claim 1, wherein the aldehydes employed are aliphatic and/or aromatic aldehydes.

6. The process according to claim 1, wherein the primary amines are selected from the group consisting of substituted or unsubstituted $C_6$-$C_{30}$-arylamine, substituted or unsubstituted $C_6$-$C_{30}$-heteroarylamine, substituted or unsubstituted $C_1$-$C_{12}$-alkyl-$C_6$-$C_{12}$-arylamine, substituted or unsubstituted $C_1$-$C_{30}$-alkyloxyamine, substituted or unsubstituted cyclic $C_3$-$C_{30}$-alkylamine, fatty amines and fatty alcohol amines, primary fatty alcohol amines, obtained from saturated or unsaturated fatty alcohols and addition onto acrylonitrile and subsequent hydrogenation.

7. The process according to claim 1, wherein the conversion product (C) is employed in amounts of 0.0001 wt % to 5 wt % based on the weight of polysiloxane having a carboxylic ester group.

8. The process according to claim 1, wherein it is carried out at a temperature of 10° C. to 200° C., and at a pressure of 0.5 to 20 bar.

9. The process according to claim 1, wherein it is carried out in the presence of a solvent selected from the group consisting of propanol, butanol, glycol, modified glycols, methyl isobutyl ketone, ethyl acetate, butyl acetate, toluene, xylene and isomers of xylene, wherein <20 wt % of solvent are employed, based on the entirety of the reaction mixture.

10. The process according to claim 1, wherein the polysiloxane is a (meth)acrylate-bearing bolysiloxane.

11. The process according to claim 2, wherein a ratio of epoxy groups to carboxylic acids of 1:0.6-1.8.

12. The process according to claim 1, wherein the metal salts (A) comprises chromium(III) acetate.

13. The process according to claim 1, wherein the aldehyde is salicylaldehyde.

14. The process according to claim 1, wherein the conversion product (C) is employed in amounts of 0.01 to 0.5 wt % based on the entirety of the polysiloxane.

15. The process according to claim 1, wherein it is carried out at a temperature of 80° C. to 140° C. and at atmospheric pressure.

* * * * *